(12) United States Patent
Staack et al.

(10) Patent No.: US 11,390,815 B2
(45) Date of Patent: Jul. 19, 2022

(54) SUBMERGED METHANE AND HYDROGEN MIXTURE DISCHARGE IN LIQUID HYDROCARBONS

(71) Applicant: The Texas A&M University System, College Station, TX (US)

(72) Inventors: David Staack, College Station, TX (US); Kunpeng Wang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 17/048,638

(22) PCT Filed: Apr. 19, 2019

(86) PCT No.: PCT/US2019/028342
§ 371 (c)(1),
(2) Date: Oct. 19, 2020

(87) PCT Pub. No.: WO2019/204742
PCT Pub. Date: Oct. 24, 2019

(65) Prior Publication Data
US 2021/0155855 A1    May 27, 2021

Related U.S. Application Data

(60) Provisional application No. 62/660,725, filed on Apr. 20, 2018.

(51) Int. Cl.
*C10G 15/08* (2006.01)
*B01J 19/08* (2006.01)
*F23Q 3/00* (2006.01)

(52) U.S. Cl.
CPC ............ *C10G 15/08* (2013.01); *B01J 19/088* (2013.01); *F23Q 3/006* (2013.01); *B01J 2219/0898* (2013.01); *C10G 2300/308* (2013.01)

(58) Field of Classification Search
CPC ............ B01J 19/088; B01J 2219/0898; C10G 2300/308; C10G 15/08; C10G 2300/302;
(Continued)

(56) References Cited

U.S. PATENT DOCUMENTS

| | | |
|---|---|---|
| 3,217,056 A | 11/1965 | Sennewald et al. |
| 2012/0116138 A1 | 5/2012 | Goodall et al. |
| 2016/0177190 A1* | 6/2016 | Novoselov ............... C10G 7/00 204/172 |

FOREIGN PATENT DOCUMENTS

| | | | | |
|---|---|---|---|---|
| WO | WO-2012/115746 A1 | 8/2012 | | |
| WO | WO-2012115746 A1 * | 8/2012 | ............. | C10G 1/002 |

(Continued)

OTHER PUBLICATIONS

Adkins, K. E., "Plasma Processing of Oils Using a Corona Reactor," Texas A&M University Thesis, pp. 1-105, Dec. 2014 (118 pages).
(Continued)

*Primary Examiner* — Ellen M McAvoy
*Assistant Examiner* — Chantel L Graham
(74) *Attorney, Agent, or Firm* — Foley & Lardner LLP

(57) ABSTRACT

A process and apparatus for cracking liquid hydrocarbon materials into light hydrocarbon fractions using a carrier gas including methane and hydrogen.

20 Claims, 5 Drawing Sheets

(58) Field of Classification Search
CPC . C10G 47/22; F23Q 3/006; F23Q 3/00; F02C
7/266
See application file for complete search history.

(56) References Cited

FOREIGN PATENT DOCUMENTS

| WO | WO-2017/017302 A1 | | 2/2017 | |
|----|-------------------|---|---------|-----------|
| WO | WO-2017/173028 A1 | | 10/2017 | |
| WO | WO-2017/173112 A1 | | 10/2017 | |
| WO | WO-2017173028 A1 | * | 10/2017 | ............. F02P 23/04 |

OTHER PUBLICATIONS

International Search Report and Written Opinion in International Patent Application No. PCT/US2019/028342 dated Jul. 30, 2019 (14 pages).
Examination Report in GC Patent Application No. 2019/37416 dated Nov. 25, 2020 (4 pages).
Supplementary European Search Report and Written Opinion on EP19788293.9 dated Nov. 18, 2021.

* cited by examiner

SUBMERGED METHANE AND HYDROGEN MIXTURE DISCHARGE IN LIQUID HYDROCARBONS

CROSS REFERENCE TO RELATED APPLICATION

This application is a U.S. National Stage Application under 35 U.S.C. § 371 of International Patent Application No. PCT/US2019/028342, filed on Apr. 19, 2019, which claims priority to U.S. Provisional Patent Application No. 62/660,725 entitled "SUBMERGED METHANE AND HYDROGEN MIXTURE DISCHARGE IN LIQUID HYDROCARBONS," filed Apr. 20, 2018, each of which is herein incorporated by reference in its entirety for all purposes.

FIELD

The present technology generally relates to high-efficiency electrical spark discharge circuit in a gas for use in economically converting heavy liquid hydrocarbons to lighter products.

BACKGROUND

The oil and gas industry are divided into three chronological sectors:—Upstream, midstream and downstream. The upstream sector involves the exploration and production section. It involves searching, producing and recovering crude oil and/or natural gas from underground or underwater fields. It also covers the process of drilling and operation of wells that recover and bring crude oil and raw gas to the surface. The exploration includes conducting geological and geophysical surveys, searching for potential underground or underwater crude oil and natural gas field, obtaining leases and permissions for drilling and the entire process of drilling.

The midstream sector involves the transportation of crude or refined petroleum products, usually via pipeline, oil tanker, barge, truck or rail. The final destination is refineries which then commences the downstream process. The midstream sector also includes the storage of these products as well as any wholesale marketing efforts. The midstream sector can also comprise of upstream and downstream elements due to its median positioning. For example, the midstream sector may include natural gas processing plants that purify the raw natural gas as well as removing and producing elemental sulfur and natural gas liquids (NGL) as finished end-products.

Recently, due to the rising price of crude oil, declining reserves of medium and light crude oil and abundance of unconventional crudes, the heavy crude oil and bitumen reserve exploitation is considerably favored. However, heavy crude oil and bitumen has many challenges to overcome, both in its production and in its transportation to refineries. Transporting heavy crude oil via pipeline is difficult due to its high density and viscosity (>1000 cP) and low mobility at reservoir temperature. Furthermore, contaminants like asphaltene deposition, heavy metals, Sulphur and brine or salt make it difficult to be transported and refined using conventional refinery methods [1]. Presence of brine or salt in heavy crude results in corrosion of the pipeline. In some cases, it may result in the formation of an emulsion such as oil-water mixture which makes transportation difficult [2]. Due to the heavy molecular weight and high viscosity of heavy crude, a high pressure drop along the pipeline is expected making it costly and energy intensive. Furthermore, asphaltene deposition cases clogging in walls, decreasing the cross-sectional area available for oil flow.

Hence to solve these problems and transport heavy crude further processes need to be carried out. They include:
- viscosity reduction e.g. preheating of the heavy crude oil and bitumen and subsequent heating of the pipeline, blending and dilution with light hydrocarbons or solvent. The viscosity of the blended mixture is determined by the diluent added and its rate. The dilution of the heavy crude requires two pipelines, one for the oil and other for the diluents, further adding additional costs.
- emulsification through the formation of an oil-in-water
- drag/friction reduction (e.g. pipeline lubrication through the use of core-annular flow, drag reducing additive), and
- in situ partial upgrading of the heavy crude to produce a Syncrude with improved viscosity, American Petroleum Institute (API) gravity, and minimized asphaltenes, sulfur and heavy metal content [3].

Partial upgrading of heavy oil involves conversion of only a portion of the vacuum residue and production of synthetic crude oil (SCO) containing 5-25% residue. They can be developed for half the cost of full upgrading but are not commercialized due to lack of technology, issues related to stability and the economics of SCO. However, in countries like Canada, due to their huge heavy crude oil resources, partial upgrading is becoming a viable option.

The downstream sector is the last stage of oil and gas industry. It includes the refining of petroleum crude oil and the processing and purifying of raw natural gas. The marketing and distribution of products derived from crude oil and natural gas are also a part of this sector. The products delivered to normal consumers include gasoline or petrol, kerosene, jet fuel, diesel oil, heating oil, fuel oil, lubricant, waxes, asphalt, natural gas and liquefied petroleum gas (LPG) as well as hundreds of petrochemicals.

In a standard oil refining process, the crude oil is desalted and passed through the atmospheric distillation that separates the it into fractions based on their range of boiling points. The atmospheric residue (AR) cut off temperature is about 350-360° C. [4]. Fractions below these boil off and are separated whereas the residue from atmospheric distillation containing longer carbon chains require further distillation at a reduced pressure and high temperature. Hence comes the vacuum distillation process that is important for further upgrading of crude oil and extract oils. The vacuum residue (VR) cut-off temperature is about 565° C. [5].

However, despite AR and VR treatments, refineries that process heavier crude will still have significant fraction of the incoming crude as residue e.g. the Lloydminster Blend residue is about 50% @ temp 460° C. Therefore, further several processes are required to crack the heavy oil. Currently there are several technologies available for the cracking of crude oil. Of these, thermal cracking is considered to be the most efficient and is widely used for converting heavy, higher molecular weight hydrocarbons into lighter, lower molecular weight fractions.

The most commonly used cracking technologies are hydrocracking, fluid catalytic cracking and delayed coker. While all of these cracking processes are associated with some advantages, they come with significant drawbacks as well. General advantages include the ability to produce different types of fuel ranging from light aviation kerosene to heavy fuel oils in large quantities.

However, a significant disadvantage of the currently employed methods for synthesizing lighter fuels from crude oil is the high financial cost associated with the realization of the technology. Both capital and operating cost are typically high for these methods. Also due to the economy of scaling, all thermal processing is most efficient only at large volume to surface area. It is estimated that the minimum efficient scale for a full range refinery is about 200 thousand barrels per day (MBD) of crude oil capacity.

In particular, the existing technology is realized at high temperatures and pressures of the working medium and therefore requires specialty materials for the manufacture of chemical reactors and other special equipment. For example, the reactors are typically made from special grade alloy steels. Another factor that adds up to the huge costs of these processes is the $H_2$ embrittlement and its quality control. Hydrogen embrittlement is the process by which hydride-forming metals such as titanium, vanadium, zirconium, tantalum, and niobium become brittle and fracture due to the introduction and subsequent diffusion of hydrogen into the metal.

The operating conditions for a single stage hydrocracker is 660-800° F. with increasing 0.1-0.2° F. per day to offset loss of catalyst activity and pressure ranging from 1,200 to 2,000 psig [6]. A fuel coker works at 910-930° F. with 15 psig typical pressures. For the fluid catalytic cracker, the reactor and regenerator are considered to be the heart of the fluid catalytic cracking unit. The reactor is at a temperature of about 535° C. and a pressure of about 25 psig while the regenerator for the catalyst operates at a temperature of about 1,320° F. and a pressure of about 35 psig [7]. These operating conditions are very expensive to maintain.

Also, the capital cost of a reforming unit like hydrocracker is highly expensive. It is estimated that a hydrocracker requires 5 times the capital cost of atmospheric distillations. For example, if a crude distillation unit of 100,000 b/d capacity costs about $90 million to build, its hydrocracker with a complexity number of 5 will require $ 450 million to process the same capacity oil [8].

Additionally, the catalysts used in FCC processes are highly sensitive to the content of various impurities in the crude oil. The presence of sulfur in the crude oil in particular leads to rapid degradation of the catalytic properties of the catalyst. Thus pretreatment (desulfurization) of the feedstock needs to be done that increases the weightage of the cost. Moreover, nickel, vanadium, iron, copper and other contaminants that are present in FCC feedstocks, all have deleterious effects on the catalyst activity and performance. Nickel and vanadium are particularly troublesome. Further, withdrawing some of the circulating catalyst as a spent catalyst and replacing them with fresh catalyst in order to maintain desired level of activity for FCC technology, adds to the operational cost of the process.

Plasma chemical methods use various types of electrical discharges to create plasma. Such methods of oil cracking and reforming have been described in various patents and publications. For example, U.S. Patent Publication No. 2005/0121366 discloses a method and apparatus for reforming oil by passing electrical discharge directly through the liquid. The disadvantage of this method is the low resource electrodes and the associated high probability of failure of ignition sparks between these electrodes. Due to the high electrical resistance of oil, the distance between the electrodes is required to be very small. For example, the distance may be on the order of about 1 mm. However, the interelectrode distance increases rapidly due to electrode erosion, leading to termination and/or breakdown of the system. Furthermore, the use of such small gaps between the electrodes allows processing of only a very small sample size at any given time.

U.S. Pat. No. 5,626,726 describes a method of oil cracking, which uses a heterogeneous mixture of liquid hydrocarbon materials with different gases, such as the treatment of arc discharge plasma. This method has the same disadvantages associated with the small discharge gap described above and requires a special apparatus for mixing the gas with the liquid, as well as the resulting heterogeneous suspension. Heating of the mixture by a continuous arc discharge leads to considerable loss of energy, increased soot formation, and low efficiency.

Russian Patent No. 2452763 describes a method in which a spark discharge is carried out in water, and the impact from the discharge is transferred to a heterogeneous mixture of a gas and a liquid hydrocarbon or oil through a membrane. This increases the electrode discharge gap which increases electrode life but reduces the effectiveness of the impact of the spark discharge on the hydrocarbon or oil. This is because much of the direct contact of the plasma discharge with the hydrocarbon medium is excluded. Additionally, the already complicated construction using a high voltage pulse generator is further complicated by the use of a heterogeneous mixture preparation apparatus and device for separation of the treated medium from the water in which the spark discharge was created.

U.S. Patent Publication No. 2010/0108492, and U.S. Pat. No. 7,931,785 describe methods having a high conversion efficiency of heavy oil to light hydrocarbon fractions. In these methods, the heterogeneous oil-gas medium is exposed to an electron beam and a non-self-maintained electric discharge. However, the practical use of the proposed method is challenging because, in addition to the complicated heterogeneous mixture preparation system, an electron accelerator with a device output electron beam of the accelerator vacuum chamber in a gas-liquid high-pressure mixture, is required. The electron accelerator is a complex technical device which significantly increases both capital costs and operating costs. In addition, any use of the fast electron beam is accompanied by a bremsstrahlung X-ray. As such, the entire device requires appropriate biological protections, further adding to the cost.

Plasma chemical reactors can be added as refinery upgrading technologies for all feedstocks. Implementation of such reactors in the refinery process rather than a heavy oil field process offers a simple and incremental development plan relative to field implementation. This is mainly because the oil to be passed through these reactors in the refineries will already have gone through many pre-processing such as dewatering, desalting, and atmospheric distillation. Hence, the overall processing will be significantly simpler compared to field implementation. The refinery can supply line voltage power, and carrier gases readily without additional requirements to include these in the upgrading process. Furthermore, these reactors will not have to meet the stringent pipeline requirements for viscosity, density, olefin content and oil stability needed in the field.

From the refinery's perspective, there will be an increased production of desired distillates and decreased loading on the coker and hydrocracker, thus by debottlenecking the process chain.

SUMMARY

In one aspect, provided is a process for cracking liquid hydrocarbon materials into light hydrocarbon fractions using a spark discharge, the process including flowing a liquid hydrocarbon material through a discharge chamber and into an inter-electrode gap within the discharge chamber, wherein the inter-electrode gap is formed between a negative electrode having a first end and a second end, and a positive electrode having a first end and a second end, wherein in the discharge chamber, the first end of the negative electrode is spaced apart from the first end of the positive electrode by a distance, the distance defining an inter-electrode gap. The process further includes, injecting a carrier gas comprising hydrogen ($H_2$) and methane into the liquid hydrocarbon material as it enters the inter-electrode gap, to form a gas-liquid hydrocarbon mixture; and subjecting the gas-liquid hydrocarbon mixture to a current between the electrodes at a voltage sufficient to effect the spark discharge. The second end of the negative electrode and the second end of the positive electrode are connected to a capacitor; and the capacitor is charged to a voltage equal to, or greater than the breakdown voltage of the carrier gas.

In some embodiments, the carrier gas consists of hydrogen ($H_2$) and methane. In some embodiments, the carrier gas is 15% v/v to 30% v/v hydrogen.

In some embodiments, the spark discharge is a pulsed spark discharge.

In some embodiments, the process further includes recovering the light hydrocarbon fractions resulting from the pulsed spark discharge on the gas-liquid hydrocarbon mixture.

In some embodiments, the light hydrocarbon fractions have a viscosity of less than 100 cP. In some embodiments, the light hydrocarbon fractions have an API gravity greater than 30.

In some embodiments, the average hydrogen atom to carbon atom ratio of the light hydrocarbon fractions is from 2 to 2.5.

In some embodiments, the concentration of hydrogen and/or methane in the carrier gas is varied over time during injection of the carrier gas into the liquid hydrocarbons. In some embodiments, carrier gas injected into the liquid hydrocarbons is recycled from the gas-liquid hydrocarbon mixture.

In another aspect, provided is an apparatus for the conversion of liquid hydrocarbon material to a light hydrocarbon fraction, wherein the apparatus includes a spark discharge chamber comprising a negative electrode having a first end and a second end, and a positive electrode having a first end and a second end, wherein the first end of the negative electrode is a distance apart from the first end of the positive electrode, wherein the distance defines an inter-electrode gap, and wherein the second end of the negative electrode and the second end of the positive electrode are connected to a capacitor. The apparatus also includes a carrier gas inlet for conveyance of a carrier gas comprising hydrogen and methane to the liquid hydrocarbon material. The apparatus also includes an inlet configured to convey liquid hydrocarbon material into the spark discharge chamber. The apparatus also includes an outlet configured to convey the light hydrocarbon fraction out of the spark discharge chamber. In some embodiments, the carrier gas is 15% v/v to 30% v/v hydrogen.

DETAILED DESCRIPTION

Figure 1:
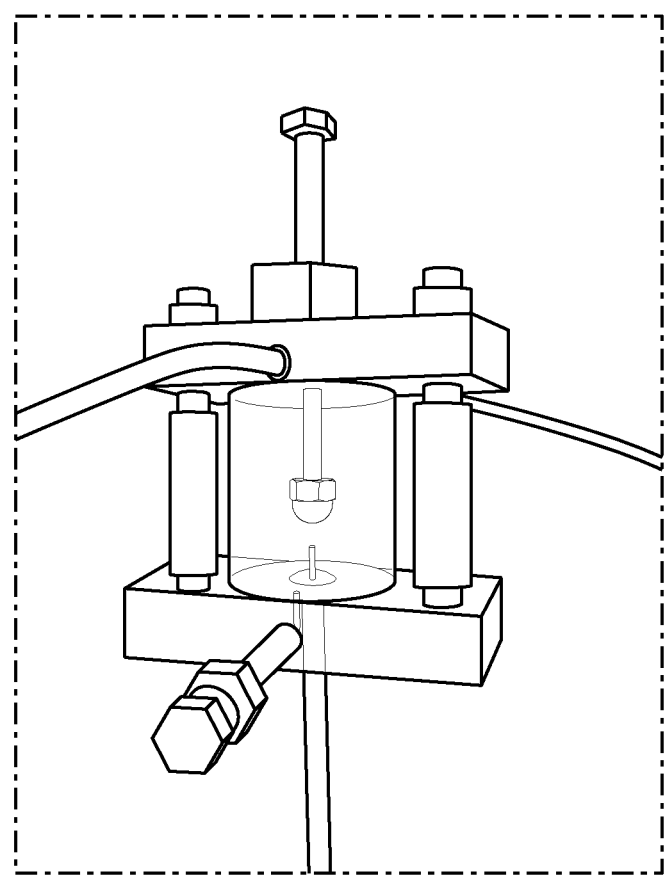
FIG. 1: A photograph of the oil treatment reactor used to process mineral oils with pulsed electrical discharge, according to potential embodiments.
Figure 2:
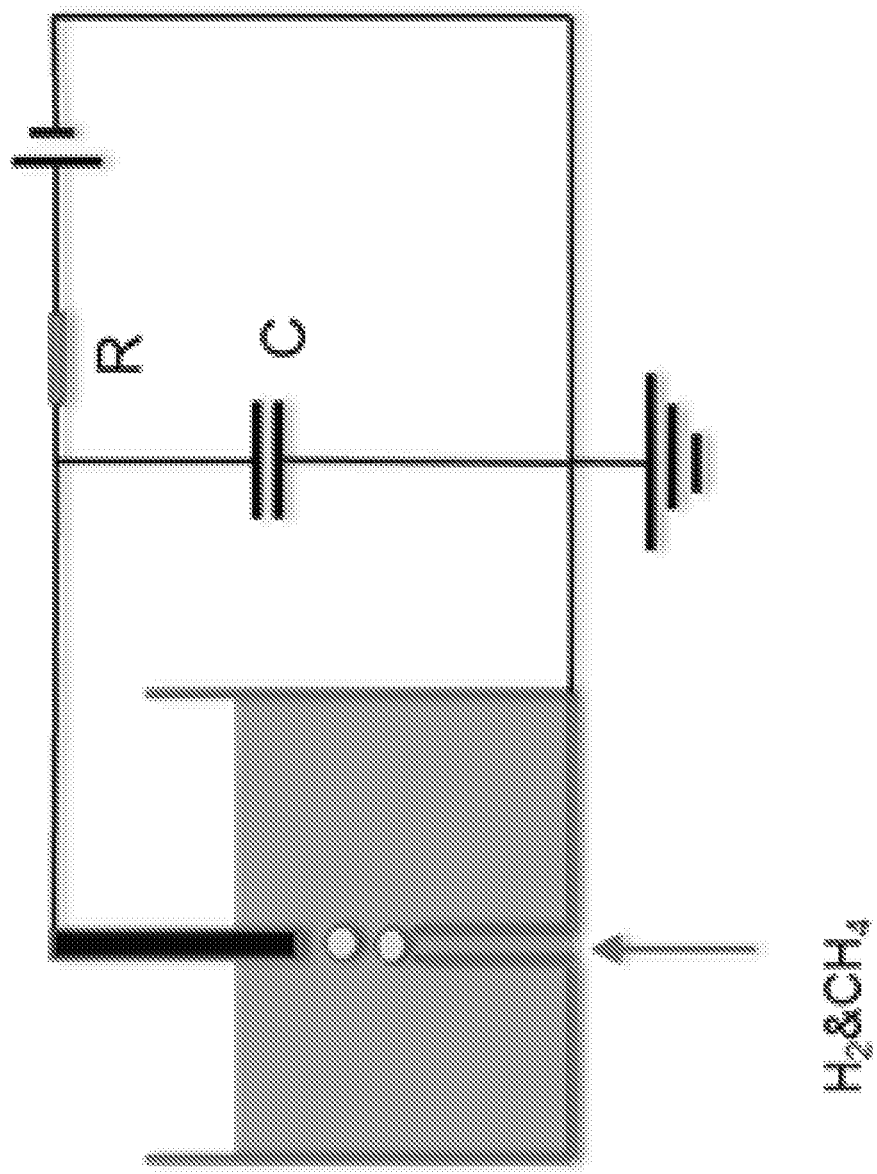
FIG. 2: A schematic representation of a reactor with electrical circuit that was used to treat different oils in a continuous flow mode, according to potential embodiments.
Figure 3:
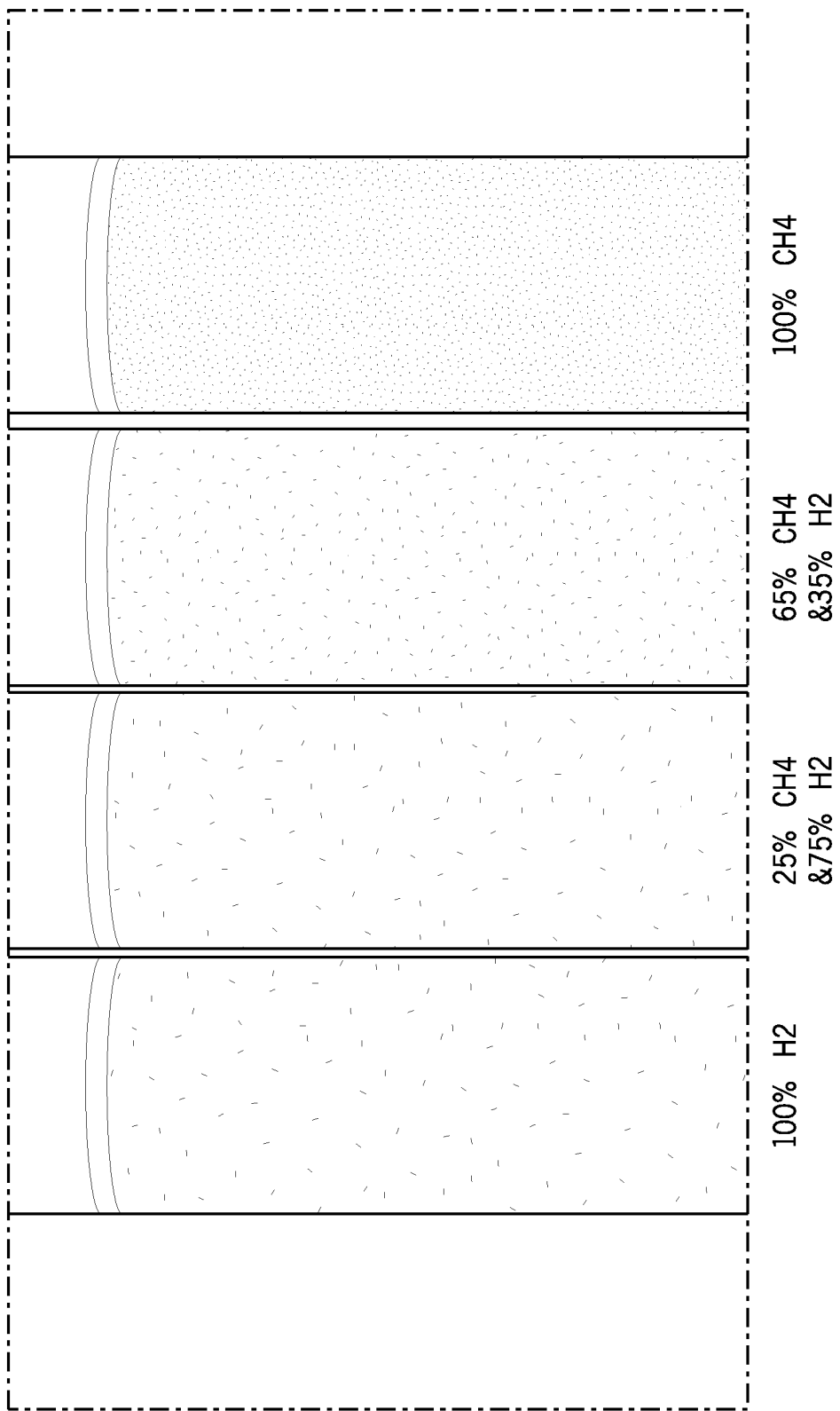
FIG. 3: A photograph of mineral oil sample treated by the process and apparatus of this disclosure with various carrier gas hydrogen and methane mixtures, according to potential embodiments.
Figure 4:
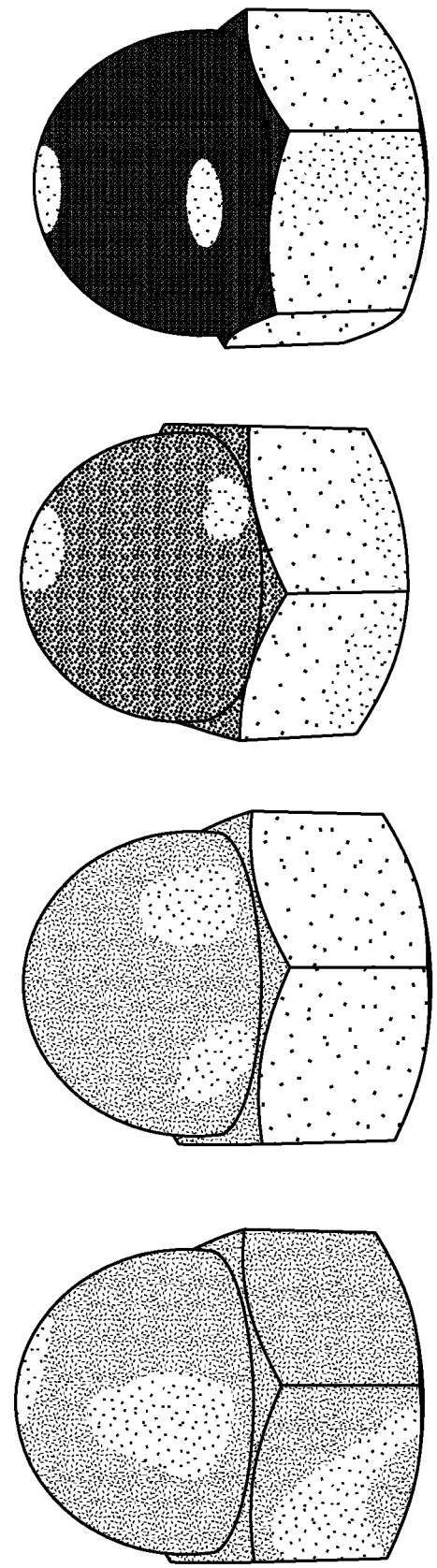
FIG. 4: A photograph of top electrode that was used to process mineral oil with hydrogen and methane as described herein, according to potential embodiments.

Among those benefits and improvements that have been disclosed, other objects and advantages of this invention may become apparent from the following description taken in conjunction with the accompanying figures. Detailed embodiments of the present invention are disclosed herein; however, it is to be understood that the disclosed embodiments are merely illustrative and may be embodied in various forms. In addition, each of the examples given in connection with the various embodiments is intended to be illustrative, and not restrictive. Any alterations and further modifications of the features illustrated herein, and any additional applications of the principles illustrated herein, which can normally occur to one skilled in the relevant art and having possession of this disclosure, are to be considered within the scope of the application.

Throughout the specification and claims, the following terms take the meanings explicitly associated herein, unless the context clearly dictates otherwise. The phrases "in one aspect" and "in some aspects" and the like, as used herein, do not necessarily refer to the same embodiment(s), though they may. Furthermore, the phrases "in another aspect" and "in some other aspects" as used herein do not necessarily refer to a different aspect (embodiment), although they may. Thus, as described below, various aspects (embodiments) of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be per-formed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "liquid hydrocarbon material" as used herein refers to those hydrocarbon compounds, and mixtures thereof, which are in the liquid state at atmospheric conditions. The liquid hydrocarbon materials may optionally have solids suspended therein. The liquid hydrocarbon materials may contain other conventional additives, including, but not limited to flow improvers, anti-static agents, anti-oxidants, wax anti-settling agents, corrosion inhibitors, ashless detergents, anti-knock agents, ignition improvers, dehazers, re-odorants, pipeline drag reducers, lubricity agents, cetane improvers, spark-aiders, valve-seat protection compounds, synthetic or mineral oil carrier fluids and anti-foaming agents. Illustrative liquid hydrocarbon materials include, but are not limited to, mineral oil; petroleum products such as crude oil, gasoline, kerosene and fuel oil; straight and branched chain paraffin hydrocarbons; cyclo-paraffin hydrocarbons; mono-olefin hydrocarbons; diolefin hydrocarbons; alkene hydrocarbons; and aromatic hydrocarbons such as benzene, toluene and xylene.

The term "cracking" as used herein refers to a process in which longer chain or heavier mass hydrocarbons are broken into shorter chain and lighter mass hydrocarbons by breaking of carbon-carbon bonds in the starting longer chain hydrocarbons.

"Discharge," "spark discharge," "electrical discharge" and the like, as used herein, refer to an abrupt electrical discharge between the two electrodes created when an electric field creates an ionized electrically conductive channel through a normally insulating medium which includes a gas.

"Target input energy" as used herein, refers to the energy input during the process when process is profitable, for example 200 kJ/kg. In some embodiments of the process or apparatus described herein, energy input is about 1,000 kJ/kg.

The present technology relates to the field of processing liquids containing heavy hydrocarbon molecules into the lighter liquid and/or gaseous fractions. The present technology can be utilized for the cracking of liquid heavy oils to lighter hydrocarbon fractions by using a stream of carrier gas injected into the liquid heavy oil to form a mixture, followed by ionization of the mixture by electric discharge. This technology can be effectively applied to achieve efficient heavy oil conversion into lighter hydrocarbons while minimizing the production of undesired solids.

Electrical discharges inside of a gas bubble submerged in an oil can be used to modify the chemical structure of crude oil or other hydrocarbons. Depending on the characteristics of the gas and the discharge properties the value of the hydrocarbon can be enhanced or diminished. Electrical techniques such as low energy and short duration high voltage pulsing alone are sometimes insufficient to ensure that the discharge process is beneficial. Control of the gas mixture can significantly affect the behavior of the electrical discharge and overall plasma-chemical process. As an example, in the application of increasing the API gravity and reducing the viscosity of heavy crude oils a gas discharge in a methane discharge has shown to be beneficial. The discharge will generate reactive species that can react with liquid hydrocarbons, effectively increasing the overall hydrogen to carbon ratio in the molecules. However, methane discharges can result in nano- and micro-particulate carbon particle formation, which are generally undesirable. The addition of hydrogen to the submerged spark discharge helps reduce solids production in the reaction region. Excess hydrogen in the gas mixture, however mitigates the effect of solid products reduction, and may have adverse effects on the hydrocarbon properties. A careful selection of the gas mixture ensures the most beneficial effects combined with a narrow range of gas flow and electrical discharge properties. This electrical discharge hydrogenation process is applicable to crude oils and other refinery intermediates and other hydrocarbons.

This submerged gas mixture discharge in hydrocarbons may be used in the crude oil upgrader. Submerged gas mixture discharge in liquid hydrocarbon will produce lighter liquid hydrocarbon species and less solids. The produced species will be used as diluent to blend locally with the raw and to reduce the mixture viscosity.

The benefits of this submerged gas mixture discharge are lighter species as diluent are produced locally and directly blend with the raw crude, this results in no need to ship diluent separately into the pipeline. Secondly, gas mixture discharge minimizes solids production or produces no solids. The blended crude oil meets transportation pipeline specs more easily. This design generally helps reduce or eliminate the demand for external diluent and promote the quality of produced diluent. This specific gas mixture control allows for the process to operate effectively over a wider range of electrical discharge and oil properties.

Various embodiments of the disclosure use a methane and hydrogen mixture discharge submerged in liquid hydrocarbons. Methane discharge in gas phase was relatively well understood, and it produces longer chain species and solids. The mixture of methane and hydrogen discharge was observed to have much less solids production. The mechanism though is thought to be based on providing a sufficient number of hydrogen radicals as to improve reaction selectivity. Embodiments of the disclosure combine a methane and hydrogen interaction mechanism with short pulsing submerged in heavy hydrocarbon material. In various implementations, products may vary significantly with different carrier gases; for example, hexadecane processed with argon may produce large amounts of reactive species which could be identified by using GC-MS, whereas hexadecane processed with hydrogen or methane under similar conditions may produce much less reactive species.

This gas discharge unit may be built into a continuous flow system of crude oil so that crude oil can be processed as it flows through the discharge chamber. This could be located near the production well on the oil field upstream of the transportation pipeline. Upgraded oils will be transported or shipped if the meets the pipeline specs. Gas mixtures would be made from co-produced gases and recycling has from the reactor.

Use of a methane and hydrogen mixture in submerged spark gap limits solids production when hydrogen is added to the gas mixture. Viscosity reduction of products is also observed.

Process

In one aspect, provided is a process for cracking liquid hydrocarbon materials into light hydrocarbon fractions using a spark discharge, the process including flowing a liquid hydrocarbon material through a discharge chamber and into an inter-electrode gap within the discharge chamber, where the inter-electrode gap is formed between a negative electrode having a first end and a second end, and a positive electrode having a first end and a second end, wherein the discharge chamber, the first end of the negative electrode is spaced apart from the first end of the positive electrode by a distance, the distance defining an inter-electrode gap; injecting a carrier gas into the liquid hydrocarbon material as it enters the inter-electrode gap, to form a gas-liquid hydrocarbon mixture; and subjecting the gas-liquid hydrocarbon mixture to a current between the electrodes at a voltage sufficient to effect a spark discharge; where the second end of the negative electrode and second end of the positive electrode is connected to a capacitor. In some embodiments, the capacitor is charged to a voltage equal to, or greater than the breakdown voltage of the carrier gas.

In some embodiments, the liquid hydrocarbon material includes crude oil. In some embodiments, liquid hydrocarbon material includes but is not limited to paraffins, aromatics, naphthenes, cycloalkanes, alkenes, dienes and alkynes. The liquid hydrocarbon material may be characterized by the total number of carbon atoms (C) and/or the amount of single (C—C), double (C═C) or triple (C≡C) bonds between carbon atoms.

Multiple hydrocarbon gases can be used to produce plasma. The use of methane or natural gas is beneficial not only in terms of the energy required to break bonds but also due to its relatively low cost. Bu using methane it is ensured that C—H bonds are broken to generate a hydrogen radical and a methyl radical, either of which may combine with larger hydrocarbon radicals in a termination step.

Non-hydrogen containing gases such as nitrogen, helium, neon, argon and xenon may be used with the hydrogen donor gases in the discharge gap. They may change the electrical and vibrational temperature distribution in the plasma by allowing the free radicals to terminate with one another instead of with a hydrogen atom from the hydrogen donor. In various embodiments, type of products and product selectivity may be changed by using non-hydrogen gas.

Water and ammonia may also act as hydrogen donor in the process except that they contain N and O elements which may not be compatible with current refinery system. There is still possibility that they could be used as hydrogen donor gases with other system that still uses the pulsed electrical discharge technology.

In some embodiments, the carrier gas comprises one or more of a $C_1$-$C_3$ hydrocarbon, natural gas, ammonia, water, nitrogen ($N_2$), helium, argon, neon, krypton, and xenon. In some embodiments, the carrier gas comprises a gas with hydrogen bond donor. In some embodiments the carrier gas comprises 0.1% v/v to 5% v/v of an inert gas. In some embodiments the carrier gas comprises 0.2% v/v to 3% v/v of an inert gas. In some embodiments the carrier gas comprises 0.5% v/v to 2% v/v of an inert gas. In some embodiments the carrier gas comprises 0.75% v/v to 1.5% v/v of an inert gas. In some embodiments the carrier gas comprises 0.9% v/v to 1.1% v/v of an inert gas.

In some embodiments, the carrier gas comprises hydrogen ($H_2$) and methane ($CH_4$). In some embodiments the mole ratio of hydrogen ($H_2$) to methane is between 1:99 to 99:1. In some embodiments the mole ratio of hydrogen to methane is between 5:95 to 95:5. In some embodiments the mole ratio of hydrogen to methane is between 10:90 to 50:50. In some embodiments the mole ratio of hydrogen to methane is between 15:85 to 40:60. In some embodiments the mole ratio of hydrogen to methane is between 20:80 to 35:65. In some embodiments the mole ratio of hydrogen to methane is between 25:75 to 30:70.

In some embodiments the carrier gas is 5 to 40% v/v $H_2$. In some embodiments the carrier gas is 10 to 35% v/v $H_2$. In some embodiments the carrier gas is 15 to 30% v/v $H_2$. In some embodiments the carrier gas is 20 to 25% v/v $H_2$.

In some embodiments, the mole ratio of hydrogen to methane in the injected carrier gas is varied over time. In some embodiments the hydrogen and methane in the injected carrier gas are premixed. In some embodiments, the hydrogen and methane are injected separately. In some embodiments, the hydrogen and methane injected are injected separately and the rates at which they are injected are each independently and optionally varied over time. In some embodiments, the carrier gas injected is recycled from the gas-liquid hydrocarbon mixture.

In some embodiments, the carrier gas is injected into the liquid hydrocarbon material at a rate of 0.005 L/min to 0.15 L/min. In some embodiments, the carrier gas is injected into the liquid hydrocarbon material at a rate of 0.01 L/min to 0.1 L/min. In some embodiments, the carrier gas is injected into the liquid hydrocarbon material at a rate of 0.012 L/min to 0.075 L/min. In some embodiments methane is injected at 0.01 L/min to 0.07 L/min. In some embodiments methane is injected at 0.014 L/min to 0.06 L/min. In some embodiments methane is injected at 0.019 L/min to 0.05 L/min. In some embodiments methane is injected at 0.02 L/min to 0.04 L/min. In some embodiments hydrogen ($H_2$) is injected at 0.02 L/min to 0.07 L/min. In some embodiments hydrogen ($H_2$) is injected at 0.03 L/min to 0.05 L/min. In some embodiments hydrogen ($H_2$) is injected at 0.04 L/min to 0.045 L/min.

In some embodiments, the spark discharge is a pulsed spark discharge with a pulsing frequency. In some embodiments, the pulsing frequency is 100-200 Hz. In some embodiments, the pulsing frequency is 15-20 Hz. In some embodiments, the pulsing frequency is 10-15 Hz. In some embodiments, the pulsing frequency is 5-10 Hz. In some embodiments, the pulsing frequency is 1-5 Hz. In some embodiments, the spark discharge is continuous. In various implementations, pulsing frequency may be related to process scale up.

In some embodiments the method further includes analyzing the liquid hydrocarbon after the spark discharge. In some embodiments the method further includes analyzing the light hydrocarbon fractions. In some embodiments, the analysis is colorimetric analysis. In some embodiments, the analysis method is gas chromatography (GC) mass spectrometry (MS) (GCMS or GC-MS). In some embodiments a gas chromatography ionization detector (GC-FID) is the analysis method. In some embodiments, the method further includes collecting light hydrocarbon fractions. In some embodiments the light hydrocarbon fractions are collected via distillation.

Figure 5:
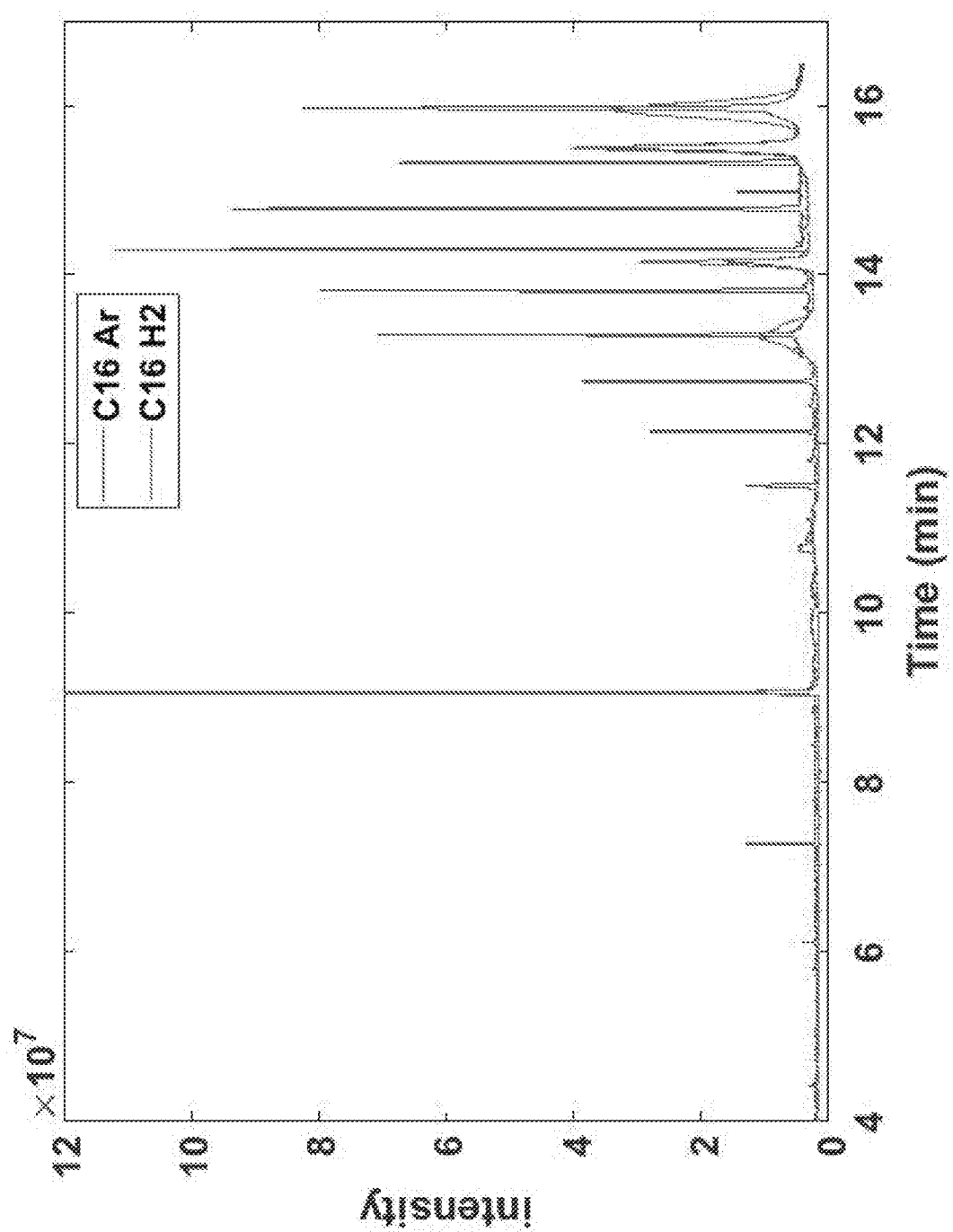
FIG. 5: A plot of GC-MS results showing intensity versus time for hexadecane processed with hydrogen and argon, according to potential embodiments.

With reference to FIG. 5, one example involves discharge in hexadecane with hydrogen and argon. Argon as a carrier gas may change the products significantly by creating more reactive species which are able to strongly interact the GC column and are later identified by MS. Those reactive species may be hydrocarbon acids or radicals which may not be identified by the GC-MS system. Methane or hydrogen as carrier gas may produce less reactive species. This method may also include analysis of product quality and selectivity. In some embodiments the method includes analyzing the cyclic or branched hydrocarbon products. In some embodiments, the analysis further includes analyzing selectivity of products.

In some embodiments, the light hydrocarbon fractions have a viscosity of 0.5 to 100 cP. In some embodiments, the light hydrocarbon fractions have a viscosity of 0.5 to 10 cP.

In some embodiments, the light hydrocarbon fractions have an API gravity of 25 to 60. In some embodiments, the light hydrocarbon fractions have an API gravity of 40 to 60.

In some embodiments, the light hydrocarbons have a molecular weight of 60 g/mol to 320 g/mol.

In some embodiments, the liquid hydrocarbon material includes a mass of 1 g to 5 g. In some embodiments, the liquid hydrocarbon material includes a mass of 5 g to 10 g. In some embodiments, the liquid hydrocarbon material includes a mass of 10 g to 15 g. In some embodiments, the liquid hydrocarbon material includes a mass of 15 g to 25 g. In some embodiments, the liquid hydrocarbon material includes a mass of 25 g to 35 g. In some embodiments, the liquid hydrocarbon material includes a mass greater than 35 g. In some embodiments, the liquid hydrocarbon material includes a mass greater than 100 g. In some embodiments, the liquid hydrocarbon material includes a mass greater than 1 kg. In some embodiments, the liquid hydrocarbon material includes a mass greater than 100 kg. In some embodiments, the liquid hydrocarbon material includes a mass greater than 1,000 kg. In some embodiments, the liquid hydrocarbon material includes a mass greater than 10,000 kg.

In some embodiments the average hydrogen atom to carbon atom ratio of a light hydrocarbon fraction is between 2.01 to 2.05. In some embodiments the average hydrogen atom to carbon atom ratio of the light hydrocarbons is between 2.05 to 2.1. In some embodiments the average hydrogen atom to carbon atom ratio of the light hydrocarbons is between 2.1 to 2.2. In some embodiments the average hydrogen atom to carbon atom ratio of the light hydrocarbons is between 2.2 to 2.3. In some embodiments the average hydrogen atom to carbon atom ratio of the light hydrocarbons is between 2.3 to 2.4. In some embodiments the average hydrogen atom to carbon atom ratio of the light hydrocarbons is between 2.4 to 2.5. In some embodiments the average hydrogen atom to carbon atom ratio of the light hydrocarbons is between 2.5 to 2.6. In some embodiments the average hydrogen atom to carbon atom ratio of the light hydrocarbons is between 2.6 to 2.7. In some embodiments the average hydrogen atom to carbon atom ratio of the light hydrocarbons is between 2.7 to 2.8. In some embodiments the average hydrogen atom to carbon atom ratio of the light hydrocarbons is between 2.8 to 2.9. In some embodiments the average hydrogen atom to carbon atom ratio of the light hydrocarbons is between 2.9 to 3.0. In some embodiments the average hydrogen atom to carbon atom ratio of the light hydrocarbons is between 3.0 to 3.1. In some embodiments the average hydrogen atom to carbon atom ratio of the light hydrocarbons is between 3.1 to 3.2. In some embodiments the average hydrogen atom to carbon atom ratio of the light hydrocarbons is between 3.2 to 3.3. In some embodiments the average hydrogen atom to carbon atom ratio of the light hydrocarbons is between 3.3 to 3.4. In some embodiments the average hydrogen atom to carbon atom ratio of the light hydrocarbons is between 3.4 to 3.5. In some embodiments the average hydrogen atom to carbon atom ratio of the light hydrocarbons is between 3.5 to 3.6. In some embodiments the average hydrogen atom to carbon atom ratio of the light hydrocarbons is between 3.6 to 3.7. In some embodiments the average hydrogen atom to carbon atom ratio of the light hydrocarbons is between 3.7 to 3.8. In some embodiments the average hydrogen atom to carbon atom ratio of the light hydrocarbons is between 3.8 to 3.9. In some embodiments the average hydrogen atom to carbon atom ratio of the light hydrocarbons is between 3.9 to 4.0.

In some embodiments, light hydrocarbon fractions comprise hydrocarbons with a molecular weight of less than 285 g/mol. In some embodiments, light hydrocarbon fractions comprise hydrocarbons with a molecular weight of less than 271 g/mol. In some embodiments, light hydrocarbon fractions comprise hydrocarbons with a molecular weight of less than 257 g/mol. In some embodiments, light hydrocarbon fractions comprise hydrocarbons with a molecular weight of less than 243 g/mol. In some embodiments, light hydrocarbon fractions comprise hydrocarbons with a molecular weight of less than 229 g/mol. In some embodiments, light hydrocarbon fractions comprise hydrocarbons with a molecular weight of less than 215 g/mol. In some embodiments, light hydrocarbon fractions comprise hydrocarbons with a molecular weight of less than 201 g/mol. In some embodiments, light hydrocarbon fractions comprise hydrocarbons with a molecular weight of less than 187 g/mol. In some embodiments, light hydrocarbon fractions comprise hydrocarbons with a molecular weight of less than 173 g/mol. In some embodiments, light hydrocarbon fractions comprise hydrocarbons with a molecular weight of less than 159 g/mol. In some embodiments, light hydrocarbon fractions comprise hydrocarbons with a molecular weight of less than 145 g/mol. In some embodiments, light hydrocarbon fractions comprise hydrocarbons with a molecular weight of less than 131 g/mol. In some embodiments, light hydrocarbon fractions comprise hydrocarbons with a molecular weight of less than 117 g/mol. In some embodiments, light hydrocarbon fractions comprise hydrocarbons with a molecular weight of less than 103 g/mol. In some embodiments, light hydrocarbon fractions comprise hydrocarbons with a molecular weight of less than 89 g/mol. In some embodiments, light hydrocarbon fractions comprise hydrocarbons with a molecular weight of less than 75 g/mol. In some embodiments, light hydrocarbon fractions comprise hydrocarbons with a molecular weight of less than 61 g/mol. In some embodiments, light hydrocarbon fractions comprise hydrocarbons with a molecular weight of less than 47 g/mol. In some embodiments, light hydrocarbon fractions comprise hydrocarbons with a molecular weight of less than 33 g/mol. In some embodiments, light hydrocarbon fractions comprise hydrocarbons with a molecular weight of less than 19 g/mol.

In some embodiments, the light hydrocarbon fractions comprise hydrocarbons having a boiling point at atmospheric pressure of less than 175° C. In some embodiments, the light hydrocarbon fractions comprise hydrocarbons having a boiling point at atmospheric pressure of less than 152° C. In some embodiments, the light hydrocarbon fractions comprise hydrocarbons having a boiling point at atmospheric pressure of less than 127° C. In some embodiments, the light hydrocarbon fractions comprise hydrocarbons having a boiling point at atmospheric pressure of less than 99° C. In some embodiments, the light hydrocarbon fractions comprise hydrocarbons having a boiling point at atmospheric pressure of less than 37° C. In some embodiments, the light hydrocarbon fractions comprise hydrocarbons having a boiling point at atmospheric pressure of less than 2° C. In some embodiments, fresh liquid hydrocarbon continuously flows through the discharge chamber. In some embodiments, liquid hydrocarbon material is recycled to flow through the same discharge chamber repeatedly.

In some embodiments the inter-electrode gap distance is from about 1 mm to 100 mm. In some embodiments the inter-electrode gap distance is 3 mm to 20 mm. In some embodiments the inter-electrode gap distance is 6 mm to 15 mm. In some embodiments the inter-electrode gap distance is less than 10 mm. In some embodiments the inter-electrode gap distance is less than 5 mm. In some embodiments the inter-electrode gap distance is less than 1 mm.

In some embodiments, the capacitor is charged to a voltage of 10 kV to 100 kV. In some embodiments, the capacitor is charged to a voltage of 20 kV to 80 kV. In some embodiments, the capacitor is charged to a voltage of 30 kV to 50 kV.

In some embodiments, the breakdown voltage of the carrier gas is 10 kV to 100 kV. In some embodiments, the breakdown voltage of the carrier gas is 10 kV to 40 kV.

Without being bound by theory, in any of the disclosed processes or embodiments, liquid hydrocarbon materials with a high carbon content are cleaved into molecules having a lower carbon content, to form hydrocarbon fractions that are lighter (in terms of both molecular weight and boiling point) on average than the heavier liquid hydrocarbon materials in the feedstock. Again, without being bound by theory, it is believed that the splitting of the heavy molecules occurs via the severing of C—C bonds. For these molecules, the energy required to break a C—C bond is about 261.9 kJ/mol. This energy amount is significantly less than the energy required to break a C—H bond (364.5 kJ/mol).

As the process is to be run continuously, the various stages or steps of the process may occur simultaneously or sequentially, such that the liquid hydrocarbon material is continuously fed to the discharge chamber as the product light hydrocarbon fractions are exited from the chamber.

In some embodiments, the process includes generating a spark discharge plasma into a jet of gas in the inter-electrode discharge gap. The breakdown voltage of the carrier gas will be less than the breakdown voltage of the liquid, accordingly, the use of a jet of gas can be used at the same voltage level to generate a longer discharge gap. Increasing the inter-electrode discharge gap, while reducing the corrosion effects of the process on the electrodes, increases the area of direct contact between the plasma discharge and liquid hydrocarbon material. Without wishing to be bound by any particular theory, it is believed that upon contact of the spark discharge plasma with the liquid hydrocarbon material in the inter-electrode discharge gap, the liquid hydrocarbon material rapidly heats and evaporates to form a vapor. Thus, molecules of the liquid hydrocarbon material are mixed with the carrier gas molecules and particles of the plasma formed therein. The plasma electrons collide with the hydrocarbon molecules, thereby breaking them down into smaller molecules having one unsaturated bond, and being essentially free radicals, i.e. fragments of molecules having a free bond. Free radicals also arise as a result of the direct interaction of fast moving electrons with the liquid walls formed around the plasma channel between the electrodes.

Various carrier gases known in the art can be used in the processes and apparatuses of the present technology. Exemplary carrier gases include, but are not limited to, helium, neon, argon, xenon, and hydrogen ($H_2$), among other gases. In some embodiments, the carrier gas is a hydrogen-containing gas, such as, but not limited to, water, steam, pure hydrogen, methane, natural gas or other gaseous hydrocarbons. Mixtures of any two or more such hydrogen-containing gases may be used in any of the described embodiment. Further, non-hydrogen containing gases, such as helium, neon, argon, and xenon may be used either as diluent gases for any of the hydrogen-containing gases, or they may be used with the liquid hydrocarbon materials, thus allowing the free radicals to terminate with one another instead of with a hydrogen atom from the carrier gas. From the standpoint of energy costs for the formation of one free hydrogen atom, in order to select a suitable carrier gas, it is necessary to compare the dissociation energy of various carrier or hydrogen-containing gases. Thus, for example, to break the bond between the hydrogen atoms in a molecule of $H_2$ would require about 432 kJ/mol. For water vapor, the energy required to liberate a hydrogen atom is about 495 kJ/mol, whereas for removal of a hydrogen atom from a hydrocarbon molecule such as methane, about 364.5 kJ/mol is required.

According to some embodiments, carrier gas is methane. The use of methane, or natural gas, is beneficial not only in terms of the energy required to break bonds, but also due to its relatively low cost. By using methane, it is ensured that C—H bonds are broken to generate a hydrogen radical and a methyl radical, either of which may combine with larger hydrocarbon radicals in a termination step. In some embodiments, the carrier gas is methane, or a mixture of methane with an inert gas such as helium, argon, neon, or xenon.

In some embodiments, the spark discharges can be either in a continuous mode, or in a pulsed mode. In some embodiments, the continuous discharge is an arc discharge or a glow discharge. However, use of this type of discharge for cracking heavy hydrocarbons may be limited by the fact that heating of the gaseous medium by continuous current may lead to undesirable increases in the temperature inside the discharge chamber. Such increases in temperature may lead to increased coking and soot production. Further, where a continuous discharge is used, the hydrocarbon fraction products are continually exposed to the discharge until they pass out of the plasma. In contrast, the use of a pulsed discharge, particularly pulsed spark discharge, may be desirable for the purpose of light hydrocarbon fraction production from heavy oil fractions, because the interval between pulses allows for termination of the free radicals and allows time for the product light hydrocarbons to exit the plasma.

Apparatus

In another aspect, provide is an apparatus for the conversion of liquid hydrocarbon material to a light hydrocarbon fraction, wherein the apparatus includes a spark discharge chamber including a negative electrode having a first end and a second end, and a positive electrode having a first end and a second end. The first end of the negative electrode is a distance apart from the first end of the positive electrode, this distance defines an inter-electrode gap. The second end of the negative electrode is connected to a capacitor. The apparatus includes a carrier gas inlet for conveyance of a carrier gas to the liquid hydrocarbon material. The apparatus further includes an inlet configured to convey liquid hydrocarbon material into the spark discharge chamber and an outlet configured to convey the light hydrocarbon fraction out of the spark discharge chamber. In some embodiments, the carrier gas includes hydrogen and/or methane.

In some embodiments, the carrier gas comprises one or more of a $C_1$-$C_3$ hydrocarbon, natural gas, ammonia, water, nitrogen ($N_2$), helium, argon, neon, krypton, and xenon. In some embodiments, the carrier gas comprises a gas with hydrogen bond donor. In some embodiments the carrier gas comprises 0.1% v/v to 5% v/v of an inert gas. In some embodiments the carrier gas comprises 0.2% v/v to 3% v/v of an inert gas. In some embodiments the carrier gas comprises 0.5% v/v to 2% v/v of an inert gas. In some embodiments the carrier gas comprises 0.75% v/v to 1.5% v/v of an inert gas. In some embodiments the carrier gas comprises 0.9% v/v to 1.1% v/v of an inert gas.

In some embodiments, the carrier gas comprises hydrogen ($H_2$) and methane ($CH_4$). In some embodiments the mole ratio of hydrogen to methane is between 1:99 to 99:1. In some embodiments the mole ratio of hydrogen to methane is between 5:95 to 95:5. In some embodiments the mole ratio of hydrogen to methane is between 10:90 to 50:50. In some embodiments the mole ratio of hydrogen to methane is between 15:85 to 40:60. In some embodiments the mole ratio of hydrogen to methane is between 20:80 to 35:65. In some embodiments the mole ratio of hydrogen to methane is between 25:75 to 30:70.

In some embodiments the carrier gas is 5 to 40% v/v $H_2$. In some embodiments the carrier gas is 10 to 35% v/v $H_2$. In some embodiments the carrier gas is 15 to 30% v/v $H_2$. In some embodiments the carrier gas is 20 to 25% v/v $H_2$. In some embodiments, the light hydrocarbon fractions have a viscosity of 0.5 to 100 cP. In some embodiments, the light hydrocarbon fractions have a viscosity of 0.5 to 10 cP.

In some embodiments, the light hydrocarbon fractions have an API gravity of 25 to 60. In some embodiments, the light hydrocarbon fractions have an API gravity of 40 to 60.

In some embodiments, the light hydrocarbons have a molecular weight of 60 g/mol to 320 g/mol.

In some embodiments the average hydrogen atom to carbon atom ratio of a light hydrocarbon fraction is between 2.01 to 2.05. In some embodiments the average hydrogen atom to carbon atom ratio of the light hydrocarbons is between 2.05 to 2.1. In some embodiments the average hydrogen atom to carbon atom ratio of the light hydrocarbons is between 2.1 to 2.2. In some embodiments the average hydrogen atom to carbon atom ratio of the light hydrocarbons is between 2.2 to 2.3. In some embodiments the average hydrogen atom to carbon atom ratio of the light hydrocarbons is between 2.3 to 2.4. In some embodiments the average hydrogen atom to carbon atom ratio of the light hydrocarbons is between 2.4 to 2.5. In some embodiments the average hydrogen atom to carbon atom ratio of the light hydrocarbons is between 2.5 to 2.6. In some embodiments the average hydrogen atom to carbon atom ratio of the light hydrocarbons is between 2.6 to 2.7. In some embodiments the average hydrogen atom to carbon atom ratio of the light hydrocarbons is between 2.7 to 2.8. In some embodiments the average hydrogen atom to carbon atom ratio of the light hydrocarbons is between 2.8 to 2.9. In some embodiments the average hydrogen atom to carbon atom ratio of the light hydrocarbons is between 2.9 to 3.0. In some embodiments the average hydrogen atom to carbon atom ratio of the light hydrocarbons is between 3.0 to 3.1. In some embodiments the average hydrogen atom to carbon atom ratio of the light hydrocarbons is between 3.1 to 3.2. In some embodiments the average hydrogen atom to carbon atom ratio of the light hydrocarbons is between 3.2 to 3.3. In some embodiments the average hydrogen atom to carbon atom ratio of the light hydrocarbons is between 3.3 to 3.4. In some embodiments the average hydrogen atom to carbon atom ratio of the light hydrocarbons is between 3.4 to 3.5. In some embodiments the average hydrogen atom to carbon atom ratio of the light hydrocarbons is between 3.5 to 3.6. In some embodiments the average hydrogen atom to carbon atom ratio of the light hydrocarbons is between 3.6 to 3.7. In some embodiments the average hydrogen atom to carbon atom ratio of the light hydrocarbons is between 3.7 to 3.8. In some embodiments the average hydrogen atom to carbon atom ratio of the light hydrocarbons is between 3.8 to 3.9. In some embodiments the average hydrogen atom to carbon atom ratio of the light hydrocarbons is between 3.9 to 4.0.

In some embodiments, light hydrocarbon fractions comprise hydrocarbons with a molecular weight of less than 285 g/mol. In some embodiments, light hydrocarbon fractions comprise hydrocarbons with a molecular weight of less than 271 g/mol. In some embodiments, light hydrocarbon fractions comprise hydrocarbons with a molecular weight of less than 257 g/mol. In some embodiments, light hydrocarbon fractions comprise hydrocarbons with a molecular weight of less than 243 g/mol. In some embodiments, light hydrocarbon fractions comprise hydrocarbons with a molecular weight of less than 229 g/mol. In some embodiments, light hydrocarbon fractions comprise hydrocarbons with a molecular weight of less than 215 g/mol. In some embodiments, light hydrocarbon fractions comprise hydrocarbons with a molecular weight of less than 201 g/mol. In some embodiments, light hydrocarbon fractions comprise hydrocarbons with a molecular weight of less than 187 g/mol. In some embodiments, light hydrocarbon fractions comprise hydrocarbons with a molecular weight of less than 173 g/mol. In some embodiments, light hydrocarbon fractions comprise hydrocarbons with a molecular weight of less than 159 g/mol. In some embodiments, light hydrocarbon fractions comprise hydrocarbons with a molecular weight of less than 145 g/mol. In some embodiments, light hydrocarbon fractions comprise hydrocarbons with a molecular weight of less than 131 g/mol. In some embodiments, light hydrocarbon fractions comprise hydrocarbons with a molecular weight of less than 117 g/mol. In some embodiments, light hydrocarbon fractions comprise hydrocarbons with a molecular weight of less than 103 g/mol. In some embodiments, light hydrocarbon fractions comprise hydrocarbons with a molecular weight of less than 89 g/mol. In some embodiments, light hydrocarbon fractions comprise hydrocarbons with a molecular weight of less than 75 g/mol. In some embodiments, light hydrocarbon fractions comprise hydrocarbons with a molecular weight of less than 61 g/mol. In some embodiments, light hydrocarbon fractions comprise hydrocarbons with a molecular weight of less than 47 g/mol. In some embodiments, light hydrocarbon fractions comprise hydrocarbons with a molecular weight of less than 33 g/mol. In some embodiments, light hydrocarbon fractions comprise hydrocarbons with a molecular weight of less than 19 g/mol.

In some embodiments, the light hydrocarbon fractions comprise hydrocarbons having a boiling point at atmospheric pressure of less than 175° C. In some embodiments, the light hydrocarbon fractions comprise hydrocarbons having a boiling point at atmospheric pressure of less than 152° C. In some embodiments, the light hydrocarbon fractions comprise hydrocarbons having a boiling point at atmospheric pressure of less than 127° C. In some embodiments, the light hydrocarbon fractions comprise hydrocarbons having a boiling point at atmospheric pressure of less than 99° C. In some embodiments, the light hydrocarbon fractions comprise hydrocarbons having a boiling point at atmospheric pressure of less than 37° C. In some embodiments, the light hydrocarbon fractions comprise hydrocarbons having a boiling point at atmospheric pressure of less than 2° C.

In some embodiments, the discharge chamber may also include a gas jet configured to introduce the carrier gas proximally to the discharge gap so as to provide a manner of mixing of the liquid hydrocarbon material with a carrier gas. The carrier gas may be injected into the liquid hydrocarbon material at, or just prior to, injection into the discharge gap. The second end of the negative electrode and the second end of the positive electrode are connected to a capacitor. In some embodiments, a power supply is provided and configured to generate the spark discharge in the inter-electrode discharge gap.

In the discharge chamber, a spark discharge is formed in the inter-electrode discharge gap when the voltage (V) applied to the electrodes is equal to, or greater than, the breakdown voltage ($V_b$) of the inter-electrode gap. The spark discharge is initiated by free electrons, which may appear on the positive electrode by field emission or by other processes of electron emission. The free electrons are accelerated into the electric field spanning the gap, and a spark plasma channel is generated as the gas in the gap is ionized. After forming a spark discharge channel, a current of discharge flows through the plasma. The voltage within the plasma channel ($V_d$) is lower than the breakdown voltage ($V_b$).

In some embodiments an arc discharge is generated when the power supply is sufficient for the current in the discharge channel to flow in a continuous mode. The heating of the plasma occurs in the spark discharge. In some embodiments, the temperature is controlled by adjusting the intensity of the discharge current. In some embodiments, the temperature is by controlled by the duration of the discharge. In certain embodiments, as a result of the plasma channel created in the carrier gas, the carrier gas temperature reaches several thousand ° C.

In some embodiments, different pulse generators are used to ignite the spark discharges. In some embodiments, a circuit discharging a pre-charge storage capacitor on load may be used. The parameters of the pulse voltage at the load are determined by the storage capacity as well as the parameters of the whole of the discharge circuit. The energy losses will depend on the characteristics of the discharge circuit, in particular loss into the switch.

In some embodiments of the present technology, a spark switch is directly used as the load, i.e., plasma reactor, thereby reducing energy losses in the discharge circuit. Further, the storage capacitor can be connected in parallel to the spark gap on the circuit with minimum inductance. The breakdown of the gap occurs when the voltage on storage capacitor reaches the breakdown voltage, and the energy input into the plasma spark occurs during the discharge of the capacitor. Consequently, energy losses in the circuit are low.

In any of the above embodiments, the positive electrode may be shaped as a flat electrode, either as a sheet, a blade, or a flat terminal, while the negative electrode is tube-shaped, i.e. cannulated. A negative, cannulated electrode, is a hollow electrode through which the carrier gas may be injected into the liquid hydrocarbon material at the inter-electrode gap. Thus, the negative, cannulated electrode may serve as the conduit for the carrier gas. Where the negative electrode is cannulated, the passage of the cannula will have a radius of curvature at the opening of the tube. The height or length of discharge electrode is usually measured from the base that is the point of attachment, to the top. In some embodiments, the ratio of the radius of curvature to the height or length of the cathode can be greater than about 10.

The inter-electrode discharge gap, i.e. the distance between the two electrodes, influences the efficiency of the process. The inter-electrode discharge gap is a feature that is amenable to optimization based upon, for example, the particular liquid hydrocarbon material fed to the discharge chamber, the injected carrier gas, and the applied voltage and/or current.

In some embodiments the inter-electrode gap distance is from about 1 mm to 100 mm. In some embodiments the inter-electrode gap distance is 3 mm to 20 mm. In some embodiments the inter-electrode gap distance is 6 mm to 15 mm. In some embodiments the inter-electrode gap distance is less than 10 mm. In some embodiments the inter-electrode gap distance is less than 5 mm. In some embodiments the inter-electrode gap distance is less than 1 mm. In some embodiments, the inter-electrode gap distance is about 4 mm.

In some embodiments, the capacitor is charged to a voltage of 10 kV to 100 kV. In some embodiments, the capacitor is charged to a voltage of 20 kV to 80 kV. In some embodiments, the capacitor is charged to a voltage of 30 kV to 50 kV. The negative electrode and the positive electrode may both project into the discharge chamber.

In some embodiments, the capacitor may be charged to a voltage equal to, or greater than, the breakdown voltage of the carrier gas, such that a spark discharge is produced. In some embodiments, the spark discharge occurs between the positive electrode and the carrier gas proximal to the first end of the positive electrode. In some embodiments, the spark discharge is continuous. In other embodiments, the spark discharge is pulsed. In some embodiments, the rate of spark discharge is regulated by the value of resistance in the charging circuit of the storage capacitor.

In some embodiments, the spark discharge is a pulsed spark discharge with a pulsing frequency. In some embodiments, the pulsing frequency is 15-20 Hz. In some embodiments, the pulsing frequency is 10-15 Hz. In some embodiments, the pulsing frequency is 5-10 Hz. In some embodiments, the pulsing frequency is 1-5 Hz. In some embodiments, the spark discharge is continuous.

In some embodiments, a power supply is connected to the entire system to provide the energy input necessary to drive the spark discharge. In some embodiments, the power supply is a DC power supply. In some embodiments the DC power supply has an operating voltage of 15-25 kV. The power supply depends on the number of discharge gaps for processing of hydrocarbon liquid, on their length, pulse repetition rate, liquid flow rate through the reactor, the gas flow rate through each gap.

In some embodiments the apparatus may include a reactor which utilizes spark-discharge gaps of about 3.5 mm length, capacitors of about 100 pF capacitance with an operating voltage of about 18 kV and a pulse repetition rate of about 5 Hz. The power supply may consume from 1 to 2 watts, while the plasma can absorb a power of about 0.97 watts directly in the discharge. The remaining energy may be dissipated in the charging system capacitors.

In some embodiments, a reservoir or pipeline system may connect the liquid hydrocarbon material inlet to a liquid hydrocarbon material source, and a reservoir or pipeline system may be connected to the first outlet for collection of the light hydrocarbon fraction product. The light hydrocarbon fraction products may be subjected to further processing by distillation separation of the lower molecular weight components, with higher molecular weight components being returned to the inlet for possible further processing in the discharge chamber. A gas capture system may be connected to the outlet on the apparatus, allowing for capture of low molecular weight hydrocarbon gases and/or carrier gases, the latter being recycled for re-injection as the carrier gas, and the former being collected for other use.

The apparatus may be adapted to any particular mode of treatment of the liquid hydrocarbon materials. Such adaptive flexibility provides ready control over the processing of crude oil, which may vary across a wide range of compositions and impurities. Control of the process conditions for cracking of the liquid hydrocarbon materials is possible by changing only a few operating parameters. For example, such parameters may include changes to the discharge gap length, and/or the applied voltage (V). Increases in the voltage may result in square proportional degree increasing of energy $W=CV^2/2$, stored on the capacitor. Changing the value of the capacitor is linearly proportional to the changing the energy input to the discharge W.

Control of the pulse repetition rate may be achieved through manipulation of the capacitance and resistance of the circuit. In some embodiments, the pulse repetition rate is from about 1 to about 10 pulses per second. In other embodiments, the pulse repetition rate is from about 2 to about 7 pulses per second. In any of the above embodiments, the pulse repetition rate is from about 3 to about 5 pulses per second.

In any of the embodiments herein, the spark discharge may be regulated by varying the rate of injection of the carrier gas or the liquid hydrocarbon materials. In some embodiments, the spark discharge is regulated by controlling the processing time of liquid hydrocarbons and hydrocarbon fraction products within the discharge chamber.

In some embodiments, carrier gas streams or jets of varying diameters may be formed in the inter-electrode gap depending on the gas flow rate and viscosity of the liquid hydrocarbon material or light hydrocarbon fractions. In some embodiments, the spark discharge plasma is not in direct contact with the liquid hydrocarbon material, by the large diameter gas jet, if it is formed at a high carrier gas flow rate. In embodiments with a low gas carrier flow rate, the gas jet diameter is comparable to the diameter of the channel spark. In such embodiments, there is an intensive interaction between the discharge plasma and the surrounding liquid. The intensive interaction indicates that the area of contact between plasma channel and liquid is maximized.

The process and apparatus described herein provide several advantages over the other known methods. For example, the currently known method, for example as disclosed in U.S. Pat. No. 5,626,726, utilizes heterogeneous mixture of liquid and gas in which the arc is generated. In embodiments of the present technology, a jet of gas, propagating in the liquid, is used for spark discharge implementation. Moreover, high electric field strength is required for the breakdown of the discharge gap in a heterogeneous mixture, for which short discharge gaps were used in the '726 patent. The short discharge gaps and the resulting prolonged work of electrical discharges leads to the wear out of electrodes of discharge gaps with concomitant increase in the length of gap and the breakdown voltage. For a fixed working voltage, with increased length the discharge in a gap reduces and ultimately ceases. Conversely, in the present technology, because the electric breakdown occurs in the gas, which has breakdown electric field much lower than the fluid (e.g. oil), longer discharge gaps can be used for the same value of operating voltage. Owing to the opportunity of using longer discharge gaps, the electrodes are not much affected by the increase in breakdown voltage, so an of discharge ignition is stable at fixed operating voltage.

The invention is further defined by the following embodiments:

Embodiment A. A process for cracking liquid hydrocarbon materials into light hydrocarbon fractions using a spark discharge, the process comprising: flowing a liquid hydrocarbon material through a discharge chamber and into an inter-electrode gap within the discharge chamber, wherein the inter-electrode gap is formed between a negative electrode having a first end and a second end, and a positive electrode having a first end and a second end, wherein in the discharge chamber, the first end of the negative electrode is spaced apart from the first end of the positive electrode by a distance, the distance defining an inter-electrode gap; injecting a carrier gas comprising hydrogen (H2) and methane into the liquid hydrocarbon material as it enters the inter-electrode gap, to form a gas-liquid hydrocarbon mixture; and subjecting the gas-liquid hydrocarbon mixture to a current between the electrodes at a voltage sufficient to effect the spark discharge; wherein: the second end of the negative electrode and the second end of the positive electrode are connected to a capacitor; and the capacitor is charged to a voltage equal to, or greater than the breakdown voltage of the carrier gas.

Embodiment B. The process of Embodiment A, wherein the carrier gas consists of hydrogen (H2) and methane.

Embodiment C. The process of Embodiment A or B, wherein the carrier gas is 15% v/v to 30% v/v hydrogen.

Embodiment D. The process of any of Embodiments A-C, wherein the spark discharge is a pulsed spark discharge.

Embodiment E. The process of any of Embodiments A-D, further comprising recovering the light hydrocarbon fractions resulting from the pulsed spark discharge on the gas-liquid hydrocarbon mixture.

Embodiment F. The process of any of Embodiments A-E, wherein the light hydrocarbon fractions have a viscosity of less than 100 cP.

Embodiment G. The process of any of Embodiments A-F, wherein the light hydrocarbon fractions have an API gravity greater than 30.

Embodiment H. The process of any of Embodiments A-G, wherein the average hydrogen atom to carbon atom ratio of the light hydrocarbon fractions is from 2 to 2.5.

Embodiment I. The process of any of Embodiments A-H, wherein the concentration of hydrogen and/or methane in the carrier gas is varied over time during injection of the carrier gas into the liquid hydrocarbons.

Embodiment J. The process of any of Embodiments A-I, wherein carrier gas injected into the liquid hydrocarbons is recycled from the gas-liquid hydrocarbon mixture.

Embodiment K. An apparatus for the conversion of liquid hydrocarbon material to a light hydrocarbon fraction, wherein the apparatus comprises: a spark discharge chamber comprising a negative electrode having a first end and a second end, and a positive electrode having a first end and a second end, wherein the first end of the negative electrode is a distance apart from the first end of the positive electrode, wherein the distance defines an inter-electrode gap, and wherein the second end of the negative electrode and the second end of the positive electrode are connected to a capacitor; a carrier gas inlet for conveyance of a carrier gas comprising hydrogen and methane to the liquid hydrocarbon material; an inlet configured to convey liquid hydrocarbon material into the spark discharge chamber; and an outlet configured to convey the light hydrocarbon fraction out of the spark discharge chamber.

Embodiment L. The apparatus of Embodiment K, wherein the carrier gas is 15% v/v to 30% v/v hydrogen.

Embodiment M. The apparatus of Embodiment K or L, wherein the light hydrocarbon fractions have a viscosity less than 100 cP.

Embodiment N. The apparatus of any of Embodiments K-M, wherein the light hydrocarbon fractions have an API gravity greater than 30.

Embodiment O. The apparatus of any of Embodiments K-N, wherein the average hydrogen atom to carbon atom ratio of the light hydrocarbon fractions is from 2 to 2.5.

Embodiment P. The apparatus of any of Embodiments K-O, wherein the capacitor is charged to a voltage equal to or greater than the breakdown voltage of the carrier gas.

REFERENCES

[1] Zhang N, Zhao S, Sun X, Zhiming X, Chunming X (2010) Storage stability of the visbreaking product from Venezuela heavy oil. Energy Fuels 24:3970-3979
[2] Martinez-Palou R, Maria de Lourdes M, Beatriz Z-R, Elizabeth M-J, Cesar B-H, Juan de la Cruz C-L, Jorge A (2011) Transportation of heavy and extra-heavy crude oil by pipeline: a review. J Pet Sci Eng 75:274-282
[3] Hart, A. (2013). A review of technologies for transporting heavy crude oil and bitumen via pipelines. Journal of Petroleum Exploration and Production Technology, 4(3), 327-336. doi:10.1007/s13202-013-0086-6
[4] Chaudhuri, U. R. (2011). Fundamentals of petroleum and petrochemical engineering (p. 52-53). Boca Raton, Fla.: CRC Press.
[5] Eser, S. (n.d.). Cut Points. Retrieved Mar. 26, 2018, from https://www.e-education.psu.edu/fsc432/content/cut-points.
[6] Jechura, J. (n.d.). Hydroprocessing: Hydrotreating and hydrotreating. Retrieved Mar. 25, 2018, from http://inside-.mines.edu/~jjechura/Refining/08_Hydroprocessing.pdf
[7] En.wikipedia.org. (2018). Fluid catalytic cracking. [online] [Accessed 6 Apr. 2018].
[8] Kaiser, M. J., & Gary, J. H. (2007). Study updates refinery investment cost curves. Oil and Gas Journal, 84-94. Retrieved Mar. 25, 2018.

For the purposes of this disclosure and unless otherwise specified, "a" or "an" means "one or more."

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A process for cracking liquid hydrocarbon materials into light hydrocarbon fractions using a spark discharge, the process comprising:
    flowing a liquid hydrocarbon material through a discharge chamber and into an inter-electrode gap within the discharge chamber, wherein the inter-electrode gap is formed between a negative electrode having a first end and a second end, and a positive electrode having a first end and a second end, wherein in the discharge chamber, the first end of the negative electrode is spaced apart from the first end of the positive electrode by a distance, the distance defining the inter-electrode gap;
    injecting a carrier gas comprising hydrogen ($H_2$) and methane into the liquid hydrocarbon material as it enters the inter-electrode gap, to form a gas-liquid hydrocarbon mixture, wherein the carrier gas is 15% v/v to 30% v/v hydrogen; and
    subjecting the gas-liquid hydrocarbon mixture to a current between the electrodes at a voltage sufficient to effect the spark discharge;
    wherein:
        the second end of the negative electrode and the second end of the positive electrode are connected to a capacitor; and the capacitor is charged to a voltage equal to, or greater than the breakdown voltage of the carrier gas.

2. The process of claim 1, wherein the carrier gas consists of hydrogen ($H_2$) and methane.

3. The process of claim 1, wherein the spark discharge is a pulsed spark discharge.

4. The process of claim 3 further comprising recovering the light hydrocarbon fractions resulting from the pulsed spark discharge on the gas-liquid hydrocarbon mixture.

5. The process of claim 1 wherein the light hydrocarbon fractions have a viscosity of less than 100 cP.

6. The process of claim 1 wherein the light hydrocarbon fractions have an API gravity greater than 30.

7. The process of claim 1, wherein the average hydrogen atom to carbon atom ratio of the light hydrocarbon fractions is from 2 to 2.5.

8. The process of claim 1, wherein the concentration of hydrogen and/or methane in the carrier gas is varied over time during injection of the carrier gas into the liquid hydrocarbons.

9. The process of claim 1, wherein carrier gas injected into the liquid hydrocarbons is recycled from the gas-liquid hydrocarbon mixture.

10. The process of claim 1, wherein the hydrogen ($H_2$) of the carrier gas is injected into the first inter-electrode gap at a first rate, and the methane is injected into the first inter-electrode gap at a second rate that is different from the first rate.

11. The process of claim 10, further comprising changing a ratio of the hydrogen ($H_2$) to the methane in the gas-liquid hydrocarbon mixture by adjusting, after a predetermined time, the first rate or the second rate.

12. The process of claim 1, wherein the spark discharge is inside of a carrier gas bubble submerged in the liquid hydrocarbon material.

13. An apparatus for the conversion of liquid hydrocarbon material to a light hydrocarbon fraction, wherein the apparatus comprises:
 a spark discharge chamber comprising a negative electrode having a first end and a second end, and a positive electrode having a first end and a second end, wherein the first end of the negative electrode is a distance apart from the first end of the positive electrode, wherein the distance defines an inter-electrode gap, and wherein the second end of the negative electrode and the second end of the positive electrode are connected to a capacitor;
 a carrier gas inlet for conveyance of a carrier gas comprising hydrogen ($H_2$) and methane to the liquid hydrocarbon material, wherein the carrier gas is 15% v/v to 30% v/v hydrogen;
 an inlet configured to convey liquid hydrocarbon material into the spark discharge chamber; and
 an outlet configured to convey the light hydrocarbon fraction out of the spark discharge chamber.

14. The apparatus of claim 13, wherein the light hydrocarbon fractions have a viscosity less than 100 cP.

15. The apparatus of claim 13, wherein the light hydrocarbon fractions have an API gravity greater than 30.

16. The apparatus of claim 13, wherein the average hydrogen atom to carbon atom ratio of the light hydrocarbon fractions is from 2 to 2.5.

17. The apparatus of claim 13, wherein the capacitor is charged to a voltage equal to or greater than the breakdown voltage of the carrier gas.

18. The apparatus of claim 13, wherein the apparatus is configured to generate a spark discharge in the inter-electrode gap.

19. The apparatus of claim 13, wherein the apparatus is configured to inject the hydrogen ($H_2$) of the carrier gas into the first inter-electrode gap at a first rate, and inject the methane into the first inter-electrode gap at a second rate that is different from the first rate.

20. The apparatus of claim 19, wherein the apparatus is further configured to change a ratio of the hydrogen ($H_2$) to the methane in the gas-liquid hydrocarbon mixture by adjusting, after a predetermined time, the first rate or the second rate.

\* \* \* \* \*